United States Patent [19]
Brewer et al.
[11] 3,757,188
[45] Sept. 4, 1973

[54] ERROR CORRECTION FOR INCREMENTAL PLOTTER

[75] Inventors: Howard E. Brewer, Santa Ana; Kim E. McCorkindale, Orange, both of Calif.
[73] Assignee: California Computer Products Inc., Anaheim, Calif.

[22] Filed: Jan. 12, 1972
[21] Appl. No.: 217,374

[52] U.S. Cl. .............................. 318/632, 318/162
[51] Int. Cl. .............................. G05d 23/275
[58] Field of Search .............................. 318/632, 162

[56] References Cited
UNITED STATES PATENTS

| | | | |
|---|---|---|---|
| 3,555,254 | 1/1971 | Gerber | 318/632 X |
| 3,405,257 | 10/1968 | Rantsch et al. | 318/632 |
| 3,491,278 | 1/1970 | Stobbe | 318/632 |
| 3,492,551 | 1/1970 | Rouxel et al. | 318/632 X |
| 3,668,501 | 6/1972 | Chitayet | 318/632 |

*Primary Examiner*—B. Dobeck
*Attorney*—John A. Duffy, Bruce D. Jimerson et al.

[57] ABSTRACT

The difference between the desired and actual location of plotting stylus of an X–Y Incremental Plotter can be corrected by the selective addition or subtraction of pulses to the control circuitry. Where position feedback is employed, the correction can be effectuated by inhibiting either a command pulse or a feedback pulse.

7 Claims, 2 Drawing Figures

ERROR CORRECTION FOR INCREMENTAL PLOTTER

BACKGROUND OF THE INVENTION

A reoccuring problem in the field of precision incremental plotting is that of compensating for the minute errors which result from mechanical tolerances, changes in paper size and lead screw non-linearity. Prior art error compensation techniques utilized circuitry which omitted command increments from the overall distance in X and Y directions. Such systems could correct for cumulative or linear errors — for example the type which occurs when the paper shrinks or expands uniformly If however, the error is localized due to lead screw tolerances for example, overall scale factor correction is not a solution. What is actually desired is a means for determining and correcting for localized as well as linear errors.

Accordingly, a primary object of the present invention is to provide a means for correcting for localized errors.

A further object of the present invention is to provide an error correcting system which can be utilized in combination with and without substantial modification of existing plotter control circuitry.

Another object of the present invention is to provide an error correcting system which can be conveniently programmed to compensate for the known errors of a particular plotter.

Other objects and advantages of the present invention will be obvious from the detailed description of a preferred embodiment given herein below.

SUMMARY OF THE INVENTION

The present invention comprises a network of gates which are selected in accordance with the X–Y coordinate position of the stylus. The command and feedback circuitry is operatively response to the gates which add or subtract counts in accordance with predetermined error data. The augmentation of the command or feedback data by a gate is controlled by adding jumper wires between points on a special circuit card.

DESCRIPTION OF A PREFERRED EMBODIMENT

A preferred embodiment of the invention comprises an electromechanical X–Y Plotter, the stylus of which is moved about the surface of a platen by drive servos, the input voltage of which is proportional to the difference between the desired command increment and an encoder signal which measures the actual location of the stylus. The slight errors between the desired location of the stylus and its actual location are compensated for by the selective addition or subtraction of one increment of position data to the drive servo system.

Figure 1:
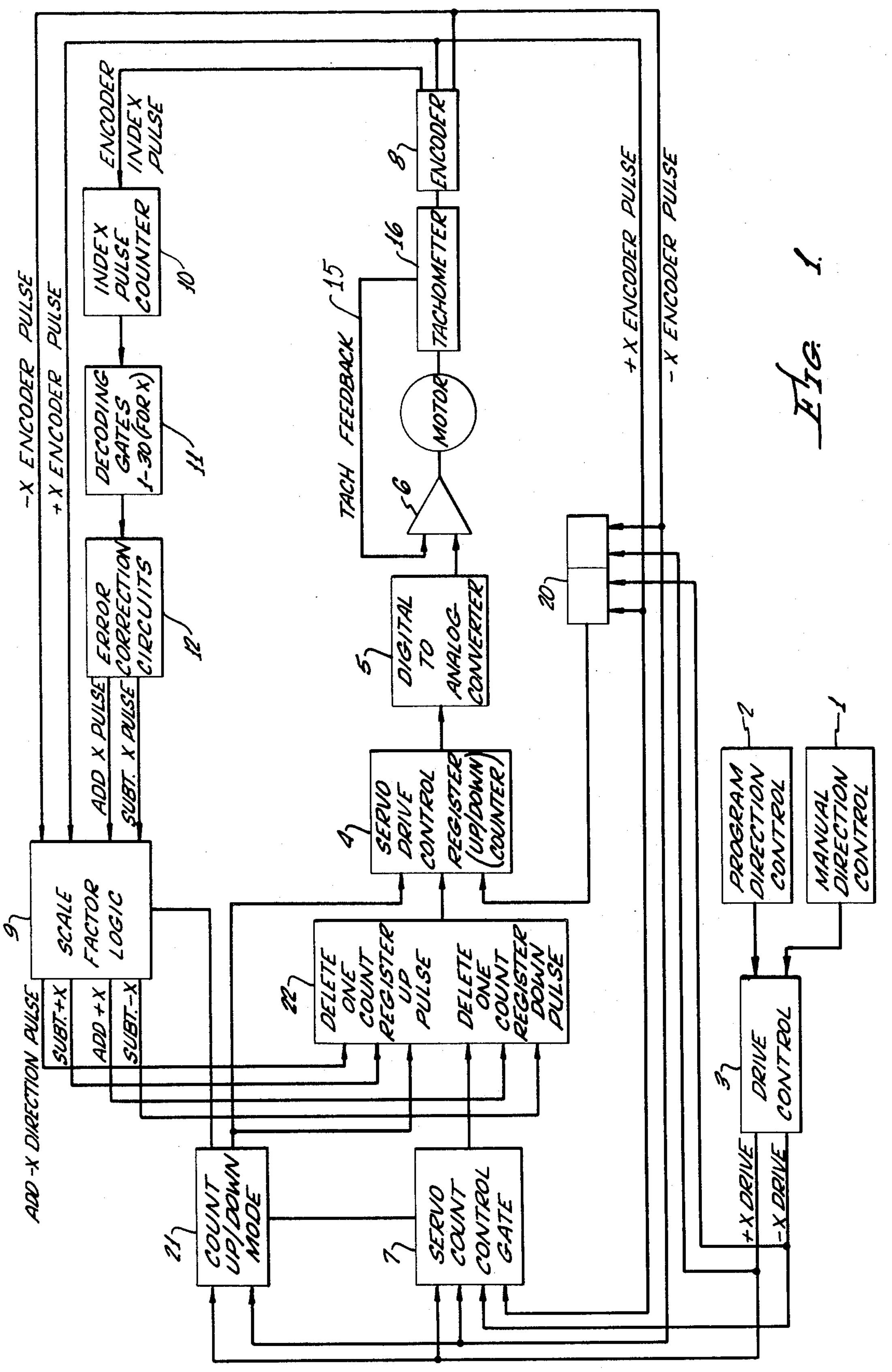
FIG. 1 shows a block diagram of the electronics for a single axis.

FIG. 1 shows a block diagram of the X axis electronics. A commanded direction and magnitude from either the manual direction control 1 or the program direction control 2 is logically decoded by the drive control 3 to produce the requisite number of pulses on either the +X or −X output lines. If there are no errors to be corrected for, the pulses pass through the servo count control gate 7 and the inhibit gate and augment or decrement the servo drive control register 4 in accordance with the state of the direction control gate 21. The count in the drive control register 4 is converted to a proportional analog voltage by the digital to analog converter 5. This voltage is amplified by the servo amplifier 6 and the output applied to the servo motor which moves the stylus via a lead screw. Also attached to the shaft of the lead screw is an encoder 8 which generates the same number of pulses for a given distance of travel as is generated by the drive control circuit 3. If there are no errors to correct for, the encoder pulses pass through gates 7 and 22 to the drive control register 4 where they are algebraically subtracted from the command pulses. When the number of encoder pulses equals the number of command pulses (register 4 returned to its original state), the stylus will be at the desired location.

If the stylus is commanded to move a given distance in a particular direction, but because of lead screw error or other mechanical tolerance which have been previously determined, it would not arrive at the precise location, the gate 22 is called into operation. For example, assume that the mechanical apparatus has been carefully tested and the errors at various positions of the stylus have been recorded. The encoder index pulses (a pulse generated once for each revolution of the encoder) are counted by the index pulse counter 10 to keep track of the location of the stylus relative to the platen. The count is decoded by the decoder 11 which causes one of error correcting circuits (box 12) to be selected. The error correcting circuits (box 12) are pre-programmed to add one pulse or to subtract one pulse, or to neither add nor subtract a pulse (if there is no error at that location).

In a typical system the stylus can move a maximum of 45 inches in the X dimension. The encoder 8 will generate one index pulse for each revolution, each revolution corresponds to one-half inch of travel. The plotting surface is arbitrarily divided into 30 zones (3 revolutions of the encoder) of 1-½ inches each. The movement of the stylus can be accurately measured using laser interferometer techniques and the deviation between the actual and desired location in any given zone determined. This data can then be used to establish whether or not command pulses should be added or subtracted. Each command pulse is equivalent to 0.0001 inches of movement. To effectively add or subtract a pulse, it is only necessary to inhibit the drive control register 4 from counting either up or down (one count) for each add or subtract pulse. This is accomplished by the inhibit gate 22.

Figure 2:
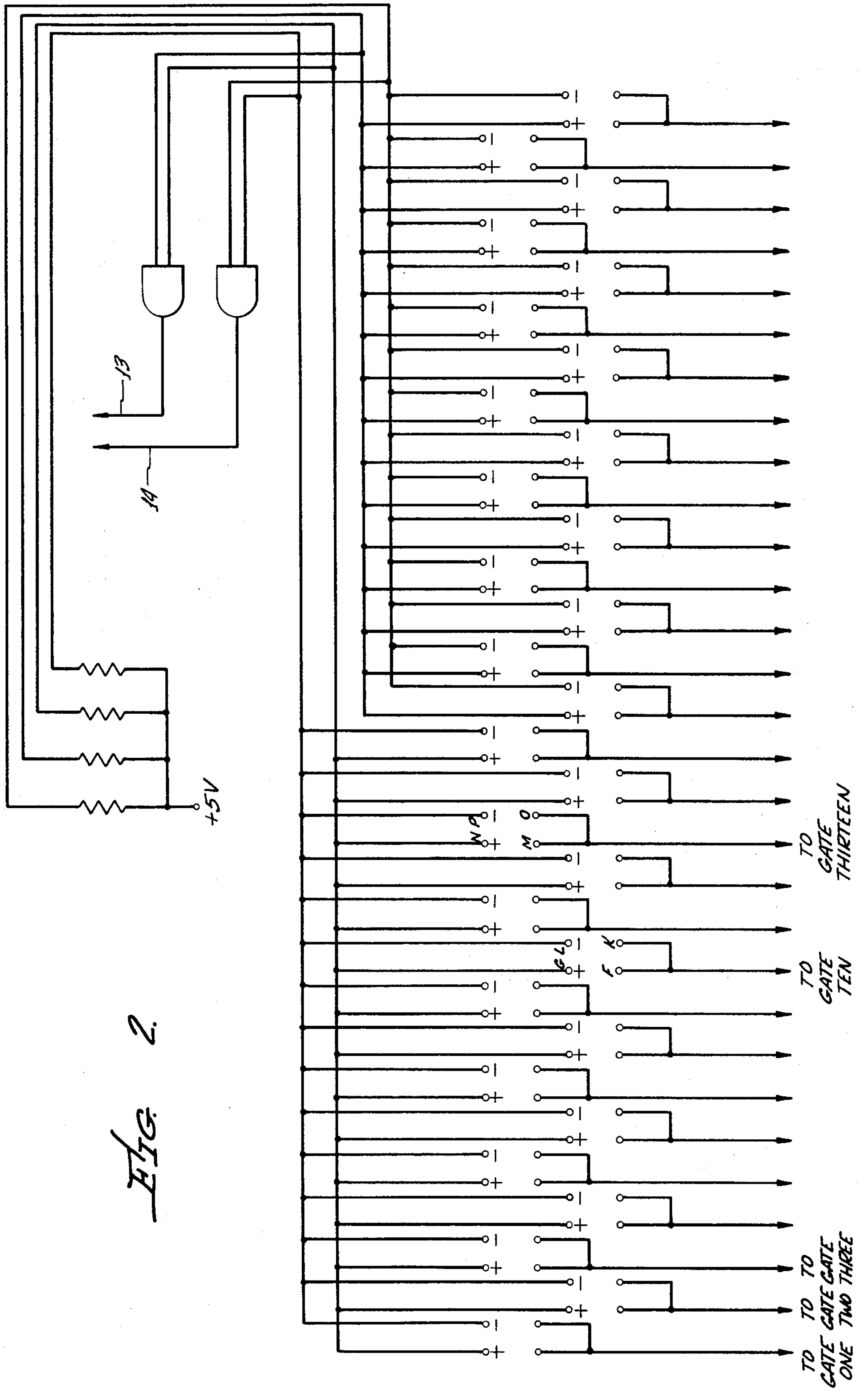
FIG. 2 shows the circuitry for a typical program card.

FIG. 2 shows the actual circuitry for programming the correction. For example, if the stylus is in zone ten, the index pulse counter will be at ten and only one of the decoding gates 11 will be true, i.e., gate ten. If it has been previously determined that a pulse is to be added when the stylus is in zone ten, the program card will have a jumper wire connecting points F and G. If it has been determined that a pulse is to be subtracted, then points K and L will have been connected with a jumper wire. If there is no correction, neither will be jumpered. Similarly, if the stylus were in zone thirteen, gate thirteen will be selected and a pulse will be added if M and N are jumpered or subtracted or O and P are jumpered, etc. For practical consideration all of the jumper terminal points for both the X and Y axis (not shown), are placed on a single plug-in card, to which the jumper wires can be added once the errors for a particular system have been determined.

What has been said with respect to the X axis is equally applicable to the Y axis. In most cases, the plotter will be rectangular rather than square and the maximum extent of the stylus movement in one dimension will be greater than its movement in the other direction. Thus, the Y axis may be 60 inches — and divided into 40 zones of 1-½ inch each.

FIG. 1 also shows the use of velocity stabilization (feedback loop 15 from tach 16). While the details of that arrangement are a matter in prior art, it will be understood that velocity, as well as other servo stabilization and overshoot minimization techniques are equally applicable to the present invention. In addition, a double count control gate 20 may be used to eliminate the error which results from null dither, i.e., where the high gain of the servo causes the encoder to overdrive, an extra pulse will be generated causing the servo to move the stylus in the reverse direction. The double count control gate is activated when an encoder pulse and drive pulse in opposite directions are received at the same time — so as to cause the servo drive register to start at a different count.

The error correcting system is equally applicable to open loop systems. If for example, the errors are known in advance, the same concept can be used to select one among a number of error gates, which have been prejumpered to add or subtract increments to the commanded increment of movement. Since there is no encoder feedback, all the addition must be done directly — i.e., by adding extra drive pulses (rather than inhibiting a feedback pulse).

The invention of course is not limited to the particular numbers chosen. The plotting surface could be divided into as many zones as desired — depending upon the degree of accuracy required. While the particular system employed a gating arrangement for inhibiting only one pulse (from either encoder or drive) it will be obvious that the concept can be extended to inhibiting two or more pulses where corrections of this magnitude are required. Thus, although a preferred embodiment has been shown and described, it will be understood that the invention is not limited thereto, and that numerous changes, modifications and substitutions may be made without departing from the spirit of the invention.

We claim:

1. An error correction system for an incremental plotting device having a stylus and wherein the X and Y axis of the plotting device are divided into a number of error correcting zones, comprising:

a program card having at least one pair of connection points associated with each error zone, said connection points being arranged such that they can be jumpered or not jumpered depending upon whether positional modification is required, and;

gating means associated with each pair of connection points for selecting the proper pair of connection points in accordance with the position of the stylus of said plotting device.

2. An error correction system for an incremental plotter having a movable plotting head and a plotting surface divided into a plurality of error correction zones comprising:

a program card having at least one pair of connection points associated with each error zone, said connection points being arranged such that they can be jumpered or not jumpered to provide stored error correction depending upon whether positional modification is required, and;

gating means associated with each pair of connection points for selecting the proper pair of connection points in accordance with the position of the plotting head of said plotter.

3. The apparatus recited in claim 2 wherein is included:

an up-down counter for each axis;

means for loading said up-down counters with a number which corresponds to the number of increments of travel in each axis;

servo means responsive to said up-down counters for positioning the plotting head;

means for modifying the count in said up-down counter in accordance with the stored error correction data which corresponds to the position of said plotting head.

4. The system recited in claim 3 wherein is included:

feedback means for determining the position of said plotting head.

5. The apparatus recited in claim 4 wherein said feedback means comprises a digital encoder.

6. The apparatus recited in claim 5 wherein is included:

counter means for counting the index pulses generated by said encoder.

7. The apparatus recited in claim 6 wherein said means for selecting the stored error comprises:

decoding means response to said counter means whereby the position of the plotting head and hence the requisite error correction data can be determined and applied to said up-down counter.

* * * * *